(12) United States Patent
Takaki et al.

(10) Patent No.: US 11,740,459 B2
(45) Date of Patent: Aug. 29, 2023

(54) HEAD-MOUNTED DISPLAY AND METHOD FOR DESIGNING WIDE-FOCUS LENS TO BE USED FOR THE HEAD-MOUNTED DISPLAY

(71) Applicants: National University Corporation Tokyo University of Agriculture and Technology, Fuchu (JP); Itoh Optical Industrial Co., Ltd., Gamagori (JP)

(72) Inventors: Yasuhiro Takaki, Fuchu (JP); Yasushi Miyajima, Gamagori (JP)

(73) Assignees: National University Corporation Tokyo University of Agriculture and Technology, Fuchu (JP); ITOH OPTICAL INDUSTRIAL CO., LTD., Gamagori (JP)

( * ) Notice: Subject to any disclaimer, the term of this patent is extended or adjusted under 35 U.S.C. 154(b) by 393 days.

(21) Appl. No.: 16/617,689

(22) PCT Filed: Jul. 22, 2019

(86) PCT No.: PCT/JP2019/028635
§ 371 (c)(1),
(2) Date: Nov. 27, 2019

(87) PCT Pub. No.: WO2020/079906
PCT Pub. Date: Apr. 23, 2020

(65) Prior Publication Data
US 2021/0286177 A1    Sep. 16, 2021

(30) Foreign Application Priority Data

Oct. 15, 2018 (JP) ................................ 2018-194640
Jan. 8, 2019 (JP) ................................ 2019-001404

(51) Int. Cl.
*G02B 27/01* (2006.01)
*G02B 3/02* (2006.01)
(Continued)

(52) U.S. Cl.
CPC ........... *G02B 27/0172* (2013.01); *G02B 3/02* (2013.01); *G02B 25/001* (2013.01);
(Continued)

(58) Field of Classification Search
CPC .... G02B 27/0172; G02B 3/02; G02B 25/001; G02B 27/0012; G02B 2003/0093;
(Continued)

(56) References Cited

U.S. PATENT DOCUMENTS 4,577,942 A * 3/1986 Frieder .................... G02C 7/02
                                               351/159.06
6,177,966 B1    1/2001 Masuda et al.
(Continued)

FOREIGN PATENT DOCUMENTS

CN      106353892 A     1/2017
CN      106537909 A     3/2017
(Continued)

OTHER PUBLICATIONS

Nitish Padmanaban et al., "Optimizing virtual reality for all users through gaze-contingent and adaptive focus displays," PNAS, vol. 114, No. 9, Feb. 28, 2017, pp. 2183-2188 and information sheet. (discussed in the spec).
(Continued)

*Primary Examiner* — Balram T Parbadia
*Assistant Examiner* — Gabriel A Sanz
(74) *Attorney, Agent, or Firm* — Locke Lord LLP

(57) ABSTRACT

Provided is a head-mounted display that enables viewing of a stereoscopic image without visual fatigue caused by vergence-accommodation conflict. A head-mounted display includes a display device to display images for the left eye and the right eye on a screen, virtual image forming optical systems for the left eye and the right eye, respectively disposed with respect to images for the left eye and the right
(Continued)

eye on the screen, and wide-focus lenses for the left eye and the right eye having a negative focal length with a range, and respectively disposed with respect to the virtual image forming optical systems for the left eye and the right eye so as to overlap optical axis directions of the virtual image forming optical systems for the left eye and the right eye. By respectively displaying virtual images of images, a permissible range of vergence and accommodation is expanded.

11 Claims, 9 Drawing Sheets

(51) Int. Cl.
| | |
|---|---|
| *G02B 25/00* | (2006.01) |
| *G02B 27/00* | (2006.01) |
| *G02C 7/02* | (2006.01) |
| *G02C 11/00* | (2006.01) |
| *G02B 3/00* | (2006.01) |

(52) U.S. Cl.
CPC ......... *G02B 27/0012* (2013.01); *G02C 7/022* (2013.01); *G02C 11/10* (2013.01); *G02B 2003/0093* (2013.01); *G02B 2027/0132* (2013.01); *G02C 2202/24* (2013.01)

(58) Field of Classification Search
CPC ........ G02B 2027/0132; G02B 27/0075; G02B 2027/0174; G02B 27/01; G02C 7/022; G02C 11/10; G02C 2202/24
See application file for complete search history.

(56) References Cited

U.S. PATENT DOCUMENTS

| | | | | |
|---|---|---|---|---|
| 2003/0161051 | A1* | 8/2003 | Sato | G02B 13/0035 |
| | | | | 359/772 |
| 2012/0250152 | A1 | 10/2012 | Larson et al. | |
| 2013/0261744 | A1* | 10/2013 | Gupta | A61B 5/0031 |
| | | | | 623/6.22 |
| 2016/0048038 | A1 | 2/2016 | Ho | |
| 2016/0327793 | A1 | 11/2016 | Chen et al. | |
| 2017/0017085 | A1 | 1/2017 | Araki et al. | |
| 2017/0018112 | A1* | 1/2017 | Vaganov | G06T 15/10 |
| 2017/0180712 | A1* | 6/2017 | Ohashi | H04N 13/20 |
| 2018/0210229 | A1* | 7/2018 | Wang | G02C 7/02 |
| 2020/0117024 | A1 | 4/2020 | Wang et al. | |
| 2020/0267380 | A1* | 8/2020 | Liu | H04N 13/371 |

FOREIGN PATENT DOCUMENTS

| | | |
|---|---|---|
| EP | 3467573 A1 | 4/2019 |
| JP | H09-297282 A | 11/1997 |
| JP | H10-282448 A | 10/1998 |
| JP | 2002-31776 A | 1/2002 |
| JP | 2005-227682 A | 8/2005 |
| JP | 2012-078670 A | 4/2012 |
| JP | 2013-532010 A | 8/2013 |
| JP | 2016-024273 A | 2/2016 |
| JP | 2018-084788 A | 5/2018 |
| WO | 2015/137165 A1 | 9/2015 |
| WO | 2015/195549 A1 | 12/2015 |
| WO | 2016/115128 A1 | 7/2016 |
| WO | 2018/096647 A1 | 5/2018 |
| WO | 2019/085487 A1 | 5/2019 |

OTHER PUBLICATIONS

Xinda Hu et al., "High-resolution optical see-through multi-focal-plane head-mounted display using freeform Optics," OSA, vol. 22, No. 11, May 30, 2014, pp. 13896-13903. (discussed in the spec).
International Search Report dated Sep. 24, 2019, issued for PCT/JP2019/028635.
Search Report, dated Jun. 17, 2021, issued for Chinese Patent Application No. 2019800026587.
Supplementary Extended European Search Report dated May 25, 2021, issued for European Patent Application No. 19805873.7.
R. E. Stevens et al., "Varifocal technologies providing Prescription and VAC mitigation in HMDs using Alvarez Lenses", Proceedings of SPIE, vol. 10676, May 21, 2018, pp. 106760J-1 - 06760J-17. (cited in the May 25, 2021 Search Report issued for EP19805873.7).
A. Wilson et al., "High-resolution optical see-through vari-focal-plane head-mounted display using freeform Alvarez lenses", Proceedings of SPIE; vol. 10676, May 21, 2018, pp. 106761J-1-106761J-7. (cited in the May 25, 2021 Search Report issued for EP19805873.7).
Second Office Action dated Mar. 11, 2022, issued for Chinese Patent Application No. 201980002658.7.
Notice of Reason for Refusal dated Dec. 13, 2022, issued for Japanese Patent Application No. 2020-502732 and English translation thereof.
Communication dated Feb. 23, 2023, issued for European Patent Application No. 19 805 873.7.

* cited by examiner

FIG. 8(A)
FIG. 8(B)
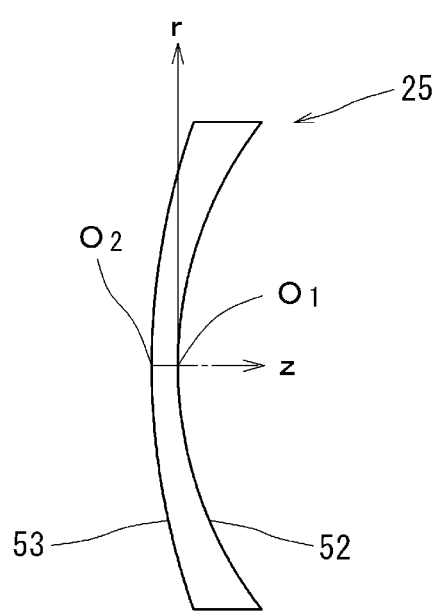
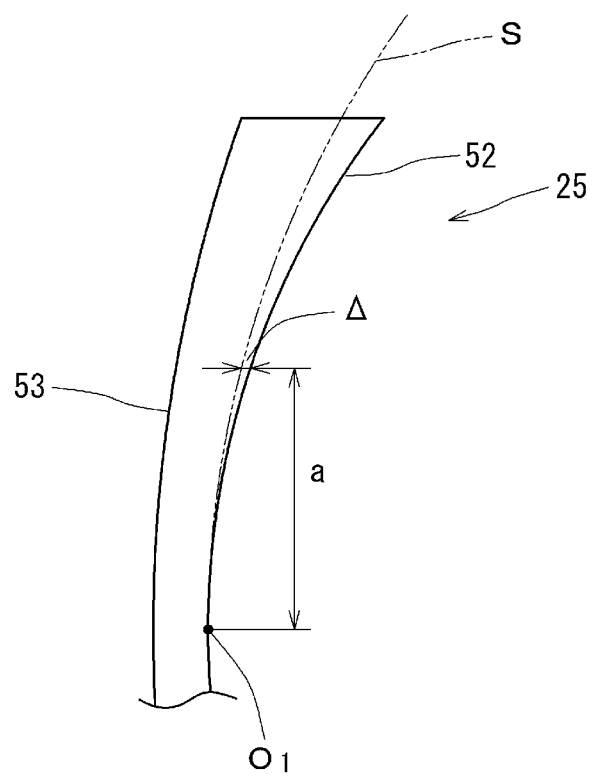

How is viewability?

Slightly better (50%) — No difference (50%)

How is eye fatigue?

Slightly better (75%) — No difference (25%)

FIG. 12(A)
FIG. 12(B)
How is viewability?
How is eye fatigue?
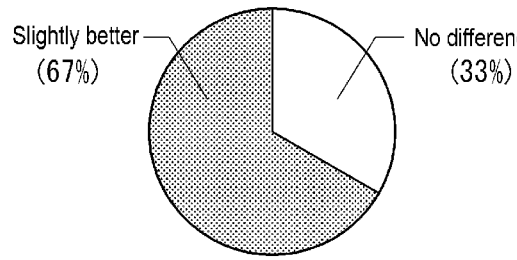
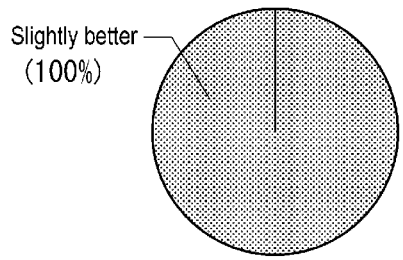

HEAD-MOUNTED DISPLAY AND METHOD FOR DESIGNING WIDE-FOCUS LENS TO BE USED FOR THE HEAD-MOUNTED DISPLAY

TECHNICAL FIELD

The present invention relates to a head-mounted display and a method for designing a wide-focus lens to be used for the head-mounted display.

BACKGROUND ART

In recent years, research and development on virtual reality (VR) technology and augmented reality (AR) technology have progressed, and use of these technologies in fields ranging from professional fields including medical and design fields to general consumer fields including game and entertainment fields are expected. In VR technology and AR technology, a head-mounted display (HMD) that is a display device to be worn on the head and displays stereoscopic images to a user by displaying parallax images corresponding to the left and right eyes on a display, is used (for example, refer to Patent Literature 1). This stereoscopic display method in which parallax images corresponding to the left and right eyes are displayed is called binocular stereoscopic display. In an HMD, in particular, by displaying a stereoscopic image with a wide angle of view, a highly immersive experience can be provided to a user.

There is a problem in binocular stereoscopic display in which use for a long time is obstructed by visual fatigue caused by vergence-accommodation conflict, and in particular, use by young people is limited (for example, refer to Patent Literature 2). Here, in vergence, when the left and right eyeballs rotate so that a point of gaze comes to the center of the retina, depth is perceived from eyeball rotation angle information due to the principle of triangulation. In accommodation, human eyes are automatically focused on a point of gaze, and depth is perceived from eye focusing information. When parallax images are displayed on a display, both eyeballs rotate and capture a stereoscopic image, and accordingly, a depth of the stereoscopic image is correctly perceived by vergence, and on the other hand, both eyes are focused on the display displaying the parallax images, so that the depth of the stereoscopic image cannot be correctly perceived by accommodation. Therefore, due to the interaction of vergence and accommodation, vergence accommodation to guide focusing of the eyes to a depth perceived by vergence cannot function for a stereoscopic image displayed by a binocular stereoscopic display. In this way, it is said that visual fatigue is caused by conflict between vergence and accommodation. In VR technology and AR technology, in some cases, a virtual image is formed at a far side ranging from a position several meters ahead to infinity, and a stereoscopic image is displayed in a hand working space at a near side and the stereoscopic image is interactively manipulated, and conflict between vergence and accommodation is more severe.

Therefore, Non-Patent Literature 1 discloses an HMD that enables focusing of the eyes on a stereoscopic image by being provided with a virtual image forming system including a variable-focal-length mirror and a display for each of the left and right eyes, and forming a virtual image of an image on the display at a plurality of different depth positions by using the variable-focal-length mirrors. Here, by using a DMD (Digital Micromirror Device) capable of performing high-speed display as a display, a stereoscopic image is displayed in a time-division manner. However, the HMD having this configuration not only increases the cost due to use of variable-focal-length mirrors but also requires a display that operates at a high speed. Further, an image processing device that generates, at a high speed, images divided in a depth direction to be displayed on the high-speed display is required.

Non-Patent Literature 2 describes an HMD that dynamically changes the virtual image forming relationship by using a variable-focal-length lens and a motor in a virtual image forming system including a display, and rotation angles of the left and right eyes are detected and a depth to be perceived by vergence is calculated, and the image forming relationship in the image forming system is changed so that a virtual image of an image on the display is formed at this depth position. However, the HMD having this configuration requires a means to detect rotation angles of the eyes. In addition, use of a mechanical mechanism including a variable-focal-length lens results in an increase in cost and weight caused by use of the mechanism which becomes problematic.

CITATION LIST

Patent Literature

Patent Literature 1: WO 2015/137165 A
Patent Literature 2: JP No. H09-297282 A

Non-Patent Literatures

Non-Patent Literature 1: X. Hu and H. Hua, "High-resolution optical see-through multi-focal-plane head-mounted display using freeform optics," Opt. Express vol. 22, p. 13896-13903 (2014)

Non-Patent Literature 2: N. Padmanaban, R. Konrad, T. Stramer, E. A. Cooper, and G. Wetzstein, "Optimizing virtual reality for all users through gaze-contingent and adaptive focus displays," PNAS vol. 114, p. 2183-2188 (2017)

SUMMARY OF INVENTION

Technical Problem

Based on the circumstances described above, an object of the present invention is to provide a head-mounted display that enables viewing of a stereoscopic image without visual fatigue caused by vergence-accommodation conflict by a simpler configuration, and a method for designing a wide-focus lens to be used for the head-mounted display.

Solution to Problem

An aspect of the present invention provides a head-mounted display including a display device to display images corresponding to the left eye and the right eye on a screen, virtual image forming optical systems corresponding to the left eye and the right eye respectively disposed for the images corresponding to the left eye and the right eye on the screen, and wide-focus lenses corresponding to the left eye and the right eye having a negative focal length with a range, respectively disposed with respect to the virtual image forming optical systems corresponding to the left eye and the right eye so as to respectively overlap optical axis directions of the virtual image forming optical systems.

The summary of the invention described above does not enumerate all of the features of the present invention. A sub-combination of these feature groups may also become an invention.

BRIEF DESCRIPTION OF DRAWINGS

FIG. 8 shows an outline view (A) of the entirety of a wide-focus lens to be used for an HMD according to a third embodiment, and an outline view (B) enlarging an upper half of the same lens.

FIG. 12 is diagrams showing results of evaluation, following FIG. 11.

DESCRIPTION OF EMBODIMENTS

Hereinafter, the present invention will be described through embodiments of the present invention, however, the following embodiments do not limit the inventions related to the scope of the claims. All of the combinations of features described in the embodiments are not always essential for solution means of the invention.

Figure 1:
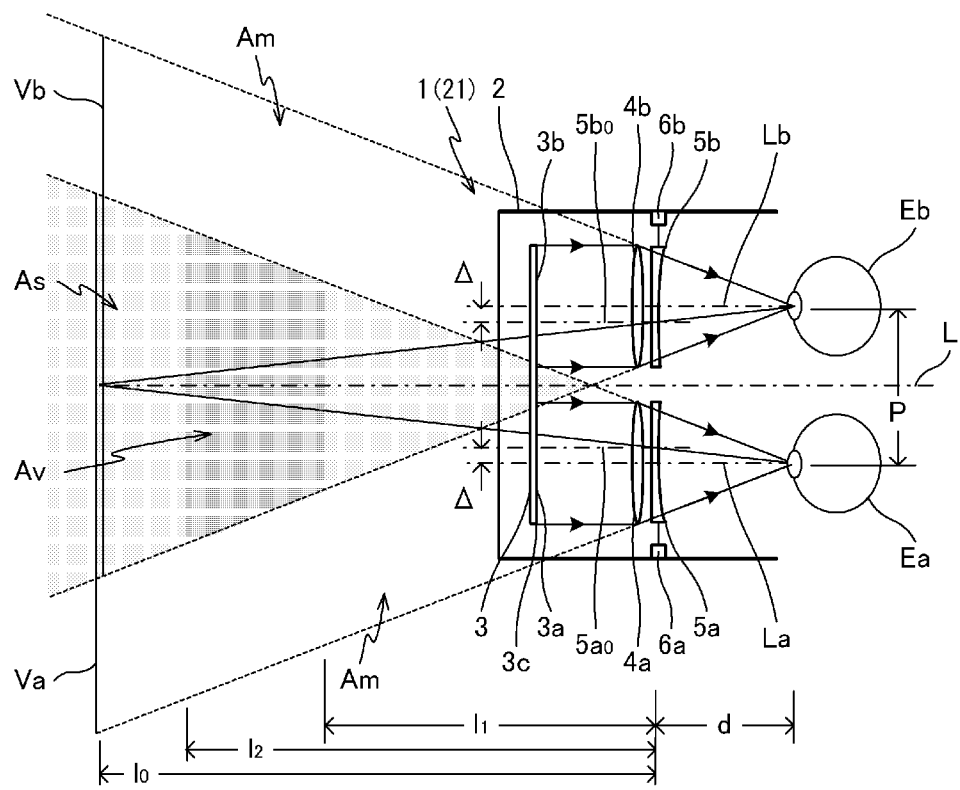
FIG. 1 is a diagram showing an outline configuration of an HMD for VR according to a first embodiment.

FIG. 1 shows an outline configuration of an HMD for VR (simply referred to as an HMD, unless otherwise confusing) according to a first embodiment. In FIG. 1 and other drawings, the left eye Ea and the right eye Eb of a user are arranged in an up-down direction of the drawings, and this direction is defined as a left-right direction, and the left-right direction of the drawings is defined as an anteroposterior direction. A reference line passing through the center between the left eye Ea and the right eye Eb and extending in the anteroposterior direction is defined as a centerline L, and reference lines respectively extending parallel to the centerline L from the left eye Ea and the right eye Eb are defined as main visual lines La and Lb. A separation distance between the left eye Ea and the right eye Eb of the user is defined as a separation distance P, and is provided by using, for example, an average separation distance between the left and right eyes of adults (typically 65 mm). The HMD 1 includes a frame 2, a display device 3, virtual image forming optical systems 4a and 4b for the left eye and the right eye, wide-focus lenses 5a and 5b for the left eye and the right eye, and actuators 6a and 6b.

The frame 2 is a housing that holds the display device 3 and other components. A shape of the frame 2 may be an arbitrary shape as long as its front surface closes to hold the display device 3 inside, the back surface opens to allow a display surface of the display device 3 to be views from the back surface side, and side surfaces surround the circumference of the front surface so as to cover the surrounding of both eyes looking into the display device 3. In addition, a mounting band (not illustrated) to mount the HMD 1 to the front of the face of a user by being connected from one side surface of the frame 2 to the other side surface around the back of the user's head may be provided. The virtual image forming optical systems 4a and 4b for the left eye and the right eye are held inside the frame 2 so that the main visual lines La and Lb of the left eye Ea and the right eye Eb respectively overlap or substantially overlap the optical axes of the virtual image forming optical systems 4a and 4b for the left eye and the right eye in a state where a user wears the HMD 1.

The display device 3 is a device to display images 3a and 3b for the left eye and the right eye on a screen 3c. As the display device 3, for example, a flat panel display such as a liquid crystal display or an organic EL display, can be used. The display device 3 is held on the reverse side of the front surface of the frame 2 so that the screen 3c faces the back surface side. The screen 3c of the display device 3 includes two regions that are positioned on the main visual lines La and Lb of the left eye Ea and the right eye Eb and respectively display the images 3a and 3b for the left eye and the right eye. Instead of the display device 3 having a single screen 3c, two display devices that respectively display the images 3a and 3b for the left eye and the right eye may be used.

The virtual image forming optical systems 4a and 4b for the left eye and the right eye (also simply referred to as virtual image forming optical systems) are optical systems respectively disposed with respect to the images 3a and 3b for the left eye and the right eye on the screen 3c of the display device 3, and respectively form virtual images of the images 3a and 3b for the left eye and the right eye on virtual image display planes Va and Vb, and project magnified upright images of the virtual images on the left eye Ea and the right eye Eb. In the present embodiment, the virtual image forming optical systems 4a and 4b for the left eye and the right eye are shown so as to each consist of a single virtual image forming lens, however, each may consist of a combination of a plurality of optical elements. The virtual image forming optical systems 4a and 4b for the left eye and the right eye are respectively disposed at the rear sides of two regions on the screen 3c in which the images 3a and 3b for the left eye and the right eye are respectively displayed.

When viewing the images 3a and 3b for the left eye and the right eye on the screen 3c with the left eye Ea and the right eye Eb through the virtual image forming optical systems 4a and 4b for the left eye and the right eye but not virtually through the wide-focus lenses 5a and 5b for the left eye and the right eye, virtual images of these images are respectively projected on the virtual image display planes Va and Vb. Here, when parallax images are provided as the images 3a and 3b for the left eye and the right eye, in an overlap region of the virtual image display planes Va and Vb, the virtual image on the virtual image display plane Va is viewed with the left eye Ea, and at the same time, the virtual image on the virtual image display plane Vb is viewed with the right eye Eb, and accordingly, the virtual images can be stereoscopically viewed inside a region As in which the overlap region is viewable from both eyes. That is, a stereoscopic image is projected inside the region As. In the regions on the virtual image display planes Va and Vb except for the overlap region, the virtual images cannot be binocularly viewed, so that, simply, the virtual image on the virtual image display plane Va is two-dimensionally viewed with the left eye Ea, and the virtual image on the virtual image display plane Vb is two-dimensionally viewed with the right eye Eb. That is, a stereoscopic image is not projected in the regions Am.

The wide-focus lenses 5a and 5b for the left eye and the right eye (simply referred to as wide-focus lenses) are wide-focus lenses having a negative focal length with a range. The wide-focus lenses 5a and 5b for the left eye and the right eye are respectively disposed with respect to the virtual image forming optical systems 4a and 4b for the left eye and the right eye so as to overlap optical axis directions of the virtual image forming optical systems 4a and 4b for the left eye and the right eye. Accordingly, virtual images of the images 3a and 3b for the left eye and the right eye formed by the virtual image forming optical systems 4a and 4b for the left eye and the right eye are formed in a range with a width extending in the optical axis directions at the further side and/or the nearer side than the virtual image display planes Va and Vb since the focal lengths of the wide-focus lenses 5a and 5b for the left eye and the right eye have a range.

In the present embodiment, the wide-focus lenses 5a and 5b for the left eye and the right eye are disposed near the virtual image forming optical systems 4a and 4b for the left eye and the right eye, and separation distances between these are sufficiently smaller than distances between the virtual image forming optical systems 4a and 4b for the left eye and the right eye and the virtual image display planes Va and Vb, or distances between the virtual image forming optical systems 4a and 4b for the left eye and the right eye and the left eye Ea and the right eye Eb.

In the present embodiment, the wide-focus lenses 5a and 5b for the left eye and the right eye are disposed at the rear sides of the virtual image forming optical systems 4a and 4b for the left eye and the right eye, however, they may be disposed at the front sides. The wide-focus lenses 5a and 5b for the left eye and the right eye may be configured by being respectively brought into contact and integrated with the virtual image forming optical systems 4a and 4b for the left eye and the right eye, or when the virtual image forming optical systems 4a and 4b for the left eye and the right eye consist of pluralities of optical elements, the wide-focus lenses 5a and 5b for the left eye and the right eye may be configured by being incorporated among the optical elements to form integral systems.

The focal lengths of the wide-focus lenses 5a and 5b for the left eye and the right eye are determined so as to enable viewing of a stereoscopic image without visual fatigue caused by vergence-accommodation conflict.

Figure 2:
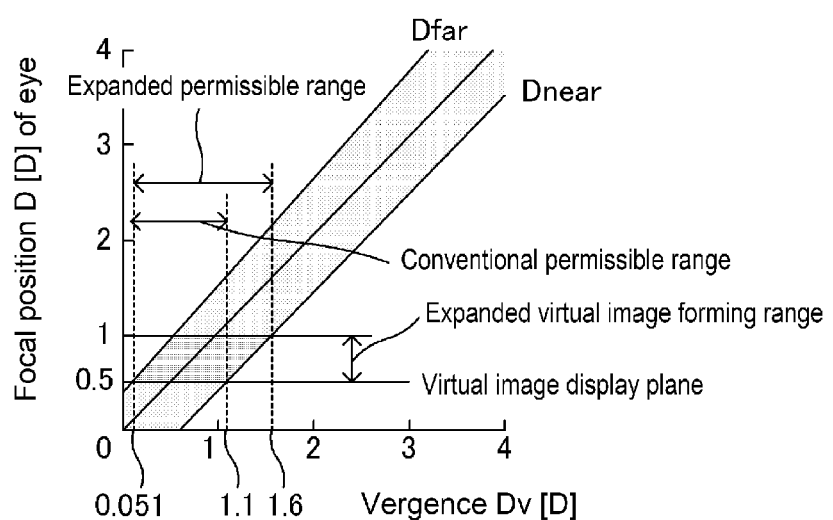
FIG. 2 is a diagram showing a relationship between vergence and accommodation enabling comfortable stereo-vision.

FIG. 2 shows a relationship between vergence and accommodation to enable comfortable stereovision. For comfortable stereovision for humans, it is preferable that vergence and accommodation match each other, however, from studies on visual fatigue, it is known that, even if they do not match each other, there is a permissible amount of mismatch to some extent (T. Shibata, J. Kim, D. M. Hoffman, M. S. Banks, "The zone of comfort: Predicting visual discomfort with stereo displays," J. Vision, vol. 11, no. 8, p. 1-29 (2011)). The permissible amount of mismatch between vergence and accommodation can be expressed by using a far end $D_{far}$ and a near end $D_{near}$ of a focal position of the eyes with respect to a depth Dv perceived by vergence. $D_{far}$ and $D_{near}$ are provided as follows by using Dv:

$$D_{far}=1.129\ Dv+0.442 \tag{1a}$$

$$D_{near}=1.035\ Dv-0.626 \tag{1b}$$

Here, $D_{far}$, $D_{near}$, and Dv are provided in units of diopter (Diopter [D]) which is a reciprocal of a focal length measured in meters.

In the region between $D_{far}$ and $D_{near}$ in FIG. 2, a mismatch between vergence and accommodation is permitted. For example, when the eyes are focused on 0.5 D (equal to 2 m), a corresponding range of a depth Dv perceived by vergence (simply referred to as a range of vergence) is 0.051 to 1.1 D (0.92 to 19 m). That is, in a case where the virtual image display planes Va and Vb are at 2 m distances from the left eye Ea and the right eye Eb, when a stereoscopic image is displayed in a range of 0.92 to 19 m, the stereoscopic image can be comfortably viewed without experiencing visual fatigue caused by vergence-accommodation conflict. In this way, a range of comfortable stereovision sufficiently extends to the further side than the virtual image display planes Va and Vb, but does not sufficiently extend to the nearer side. In particular, in VR technology and AR technology, in many cases, virtual images are formed at the far side ranging from several meters (typically 2 m) ahead of the left eye Ea and the right eye Eb to infinity, and a stereoscopic image is formed in a working space that spread in front of the user (typically, a region of approximately 60 cm from the left eye Ea and the right eye Eb) and the stereoscopic image is interactively manipulated, so that in stereoscopic display of the HMD 1, it is preferable that the range of comfortable stereovision is expanded to the near side.

In order to expand the range in which stereovision can be comfortably performed to the nearer side than the virtual image display planes Va an Vb, wide-focus lenses 5a and 5b for the left eye and the right eye having a negative focal length are used. Here, the range of the focal lengths of the wide-focus lenses 5a, 5b for the left eye and the right eye is set from $f_1$ to $f_2$, and a distance from the wide-focus lenses 5a and 5b for the left eye and the right eye to the virtual image display planes Va and Vb is defined as $I_0$. The range ($I_1$ to $I_2$) in which virtual images are displayed by the wide-focus lenses 5a and 5b for the left eye and the right eye is obtained as follows by using an equation of $1/I_0-1/I=1/f$ for the lenses:

$$I_1=(1/I_0-1/f_1)^{-1} \tag{2a}$$

$$I_2=(1/I_0-1/f_2)^{-1} \tag{2b}$$

As an example, by setting a range of the focal length from $f_1=-2.0$ m ($-0.5$ D) to $f_2=-\infty(-0$ D) with respect to a distance $I_0=2$ m (0.5 D), the virtual image forming range is expanded to the nearer side than the virtual image display planes Va, Vb and becomes a range from $I_1=1.0$ m (1.0 D)

to $I_2=I_0$ (0.5 D), and in this range, the eyes can be focused on virtual images. In FIG. 1, in order to distinguish the distance $I_0$ from the wide-focus lenses 5a, 5b for the left eye or the right eye to the virtual image display planes Va, Vb and the virtual image forming range $I_2$, they are illustrated by setting $I_0 \neq I_2$.

In response to expanding of the virtual image forming range to the near side (that is, $I_1$ ($<I_0$)), as shown in FIG. 2, a permissible range of vergence obtained by using $D_{far}$ and $D_{near}$ is expanded to the near side and becomes 0.64 to 19 m (0.051 to 1.6 D), and comfortable stereovision is enabled in a working space that spreads in front of a user.

Hereinafter, an example of design of the wide-focus lenses 5a and 5b for the left eye and the right eye, having a negative focal length with a range, is described.

Figure 3A:
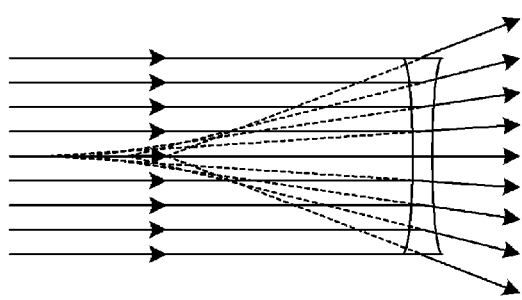
FIG. 3 shows a diagram (A) showing a shape of a wide-focus lens having a negative focal length with a range, and a diagram (B) showing a distribution of focal length (refractive power) with respect to a distance from the center.
Figure 3B:
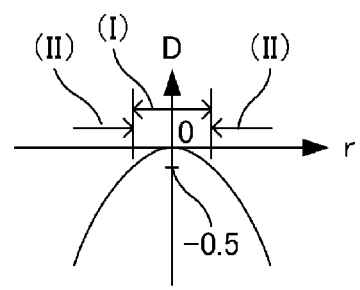

FIG. 3 shows a shape (A) of the wide-focus lenses 5a, 5b for the left eye or the right eye, and a distribution (B) of focal length with respect to a distance from the center. Here, the focal length is expressed by refractive power as a reciprocal of the focal length. The wide-focus lens has refractive power the value of which is negative and minimum in absolute value (zero in the present embodiment) at the optical center, and becomes increasingly negative and larger in absolute value with an increasing distance from the optical center. A lens region is divided into a region (I) near the center which generates refractive power in a target range with respect to a size of the pupil of the eye, for example, refractive power corresponding to the above-described focal length from $f_1=-2.0$ m ($-0.5$ D) to $f_2=-\infty$ ($-0$ D), and an outer region (II) which generates refractive power in a target range.

As the wide-focus lenses 5a, 5b, axicon (G. Mikula, Z. Jaroszewicz, A. Kolodziejczyk, K. Petelczyc, and M. Sypek, "Images with extended focal depth by means of lenses with radial and angular modulation," Opt. Express, vol. 15, no. 15, p. 9184-9193 (2007)), axilens (J. Sochacki, A. Kolodziejczyk, Z. Jaroszewicz, and S. Bara, "Nonparaxial design of generalized axicons," Appl. Opt., vol. 31, p. 5326-5330 (1992)), light sword optical element (N. Davidson, A. A. Friesem, and E. Hasman, "Holographic axilens: high resolution and long focal depth," Opt. Lett., vol. 16, p. 523-525 (1991)), and a third-order aspherical lens (Japanese Patent Laid-Open No. 2016-206338), etc., can be used. As a material of the wide-focus lenses 5a, 5b, a plastic resin (plastic) can be used.

Expressing a surface shape of the wide-focus lenses 5a and 5b for the left eye and the right eye by using a function Z(r) of a distance r from the optical center, refractive power (reciprocal $f^{-1}$ of focal length) is provided as follows by using a refractive index n:

[Numerical Expression 1]

[Numerical Expression 1]

$$\frac{1}{f} = (n-1)\frac{d^2 Z(r)}{dr^2} \quad (3)$$

When a third-order aspherical lens is used, by providing $Z(r)=Er^3$ by using a coefficient E, a distribution of refractive power can be obtained as:

$$1/f = 6(n-1)Er \quad (4)$$

[Numerical Expression 2]

Therefore, the refractive index n of the lens and the coefficient E are determined so that, for example, refractive power $f^{-1}$ satisfies $f_2^{-1}=-0$ D at the center (r=0), and $f_1^{-1}=-0.5$ D at an end portion $r_0$.

Figure 4:
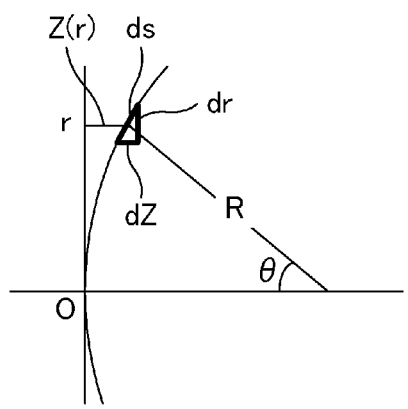
FIG. 4 is a diagram showing a surface shape of the wide-focus lens.

Equation (3) described above is derived as follows. FIG. 4 shows a surface shape of the wide-focus lens. By using a minute change dr in distance r and a minute length dZ in a thickness direction corresponding to a minute length ds along the lens surface, the following is provided:

[Numerical Expression 3]

[Numerical Expression 3]

$$ds = \sqrt{dr^2 + dZ^2} = \sqrt{1 + \left(\frac{dZ}{dr}\right)^2}\, dr \quad (5)$$

The minute length ds can be regarded as an arc when it is sufficiently short, so that by using a curvature radius R of the arc and a corresponding minute angle dθ, ds can be expressed as ds=Rdθ. Here, a focal length f that the spherical surface with the curvature radius R has is provided as:

[Numerical Expression 4]

[Numerical Expression 4]

$$\frac{1}{f} = (n-1)\frac{1}{R} \quad (6)$$

ds≈dr is satisfied, and the angle θ can be expressed as θ=dZ/dr, so that by applying these relational expressions to Equation (6), Equation (3) is derived.

Optical centers of the wide-focus lenses 5a and 5b for the left eye and the right eye are respectively disposed by being shifted toward the center side between the lenses in the left-right direction, that is, toward the centerline L with respect to the optical centers (that is, optical axes) of the virtual image forming optical systems 4a and 4b for the left eye and the right eye. Here, shift amounts Δ of the respective optical centers of the wide-focus lenses 5a and 5b for the left eye and the right eye with respect to the optical axes of the virtual image forming optical systems 4a and 4b for the left eye and the right eye are determined.

Figure 5A:
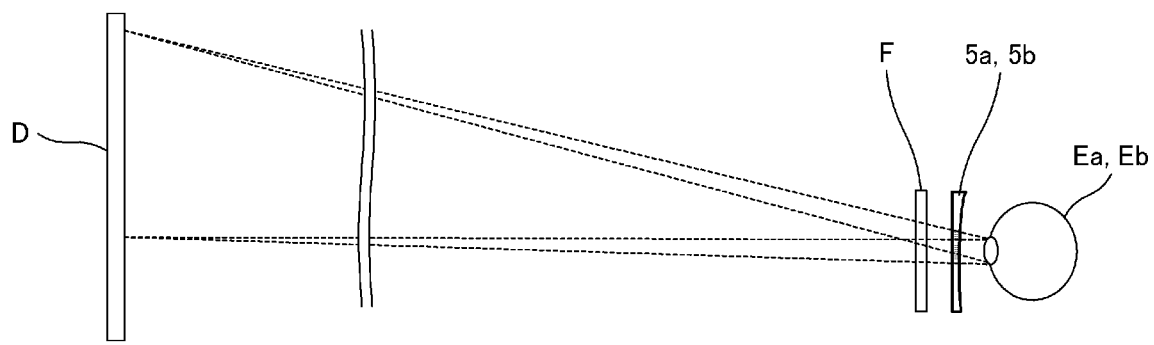
FIG. 5A is a diagram showing a comparative example of a relationship between an angle of a visual line and a position that the visual line passes through inside a wide-focus lens in a stereoscopic display device with a small angle of view.

FIG. 5A shows, as a comparative example, a relationship between an angle of a visual line and a position that the visual line passes through inside the wide-focus lenses 5a, 5b in a stereoscopic display device with a small angle of view such as a 3D movie or a stereoscopic television. In the stereoscopic display device according to the comparative example, a user wears stereoscopic glasses to which wide-focus lenses 5a and 5b and a filter F are attached, and views a stereoscopic image by viewing a display surface D through the stereoscopic glasses. The filter F is an optical element for separating images for the left eye and the right eye, such as a polarization filter, a liquid crystal shutter, a chromatic filter, a spectral filter, etc. At this time, light that exits from the display surface D enters the left eye Ea and the right eye Eb through the wide-focus lenses 5a and 5b. Here, distances from the wide-focus lenses 5a and 5b to the display surface D can be regarded as sufficiently longer than distances from the wide-focus lenses 5a and 5b to the left eye Ea and the right eye Eb, so that the angle of view of the display surface D is small, and light beam groups that exit from the respective points on the display surface D and enter the left eye Ea and the right eye Eb pass through substantially the same positions on the wide-focus lenses 5a and 5b, specifically, optical centers regardless of the positions on the display surface D from which the light beam groups exit. Therefore, the range of the focal lengths of the wide-focus lenses 5a and 5b can be regarded as constant with respect to visual directions for viewing the display surface D from both eyes Ea and Eb (that is, visual line angles).

Figure 5B:
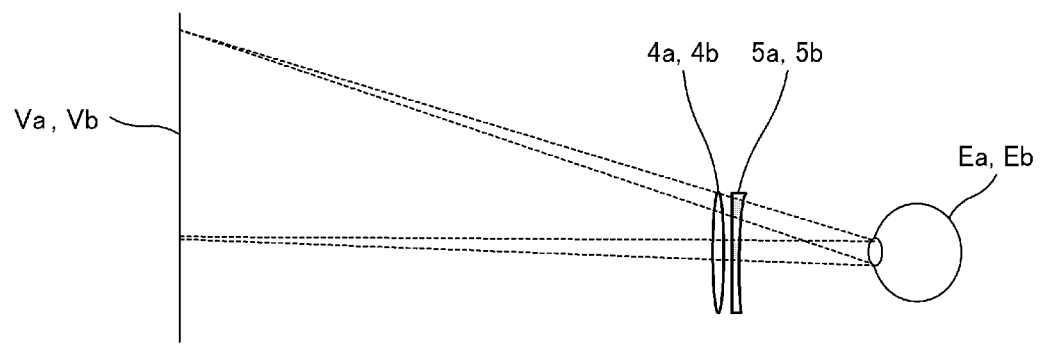
FIG. 5B is a diagram showing a relationship between an angle of a visual line and a position that the visual line passes through inside a wide-focus lens in an HMD with a large angle of view.

FIG. 5B shows a relationship between a visual line angle and a position that the visual line passes through inside the wide-focus lenses 5a, 5b in an HMD 1 with a large angle of view. In the case of the HMD 1, a wide angle of view is preferred in order to increase the immersive experience, so that angles of view of the virtual image display planes Va, Vb become large. The wide-focus lens must be prevented from coming into contact with user's eyelashes, and there is a case where a user desires to wear the HMD 1 while wearing the user's own glasses, so that the wide-focus lenses 5a and 5b must be slightly separated from the left eye Ea and the right eye Eb. From the above, light beam groups that exit from the respective points on the screen 3c of the display device 3 (virtually, virtual image display planes Va and Vb) and enter the left eye Ea and the right eye Eb pass through different positions on the wide-focus lenses 5a and 5b, specifically, ranges more widely expanding than the pupils according to the positions of the respective points. Therefore, the focal lengths of the wide-focus lenses 5a and 5b and the range of the focal lengths differ according to visual directions for viewing the virtual image display planes Va and Vb from the left eye Ea and the right eye Eb (that is, visual line angles), and effects of the wide-focus lenses 5a and 5b on virtual image formation, that is, the expansion of the permissible range of vergence and accommodation changes according to the visual direction.

Therefore, when the optical axes of the virtual image forming optical systems 4a and 4b for the left eye and the right eye are made to match respective optical centers $5a_0$ and $5b_0$ (that is, optical axes) of the wide-focus lenses 5a and 5b for the left eye and the right eye, the outer regions (II) of the wide-focus lenses 5a and 5b for the left eye and the right eye correspond to the stereovision region As, and the permissible range of vergence and accommodation cannot be effectively expanded. Therefore, in order to expand the range of comfortable stereovision in the stereovision region As, the regions (I) near the centers of the wide-focus lenses 5a and 5b for the left eye and the right eye are shifted toward the centerline L side so as to face the region As. In the region Am, a two-dimensionally displayed virtual image is viewed with only one of the left eye Ea and the right eye Eb, so that vergence-accommodation conflict does not occur.

Figure 6A:
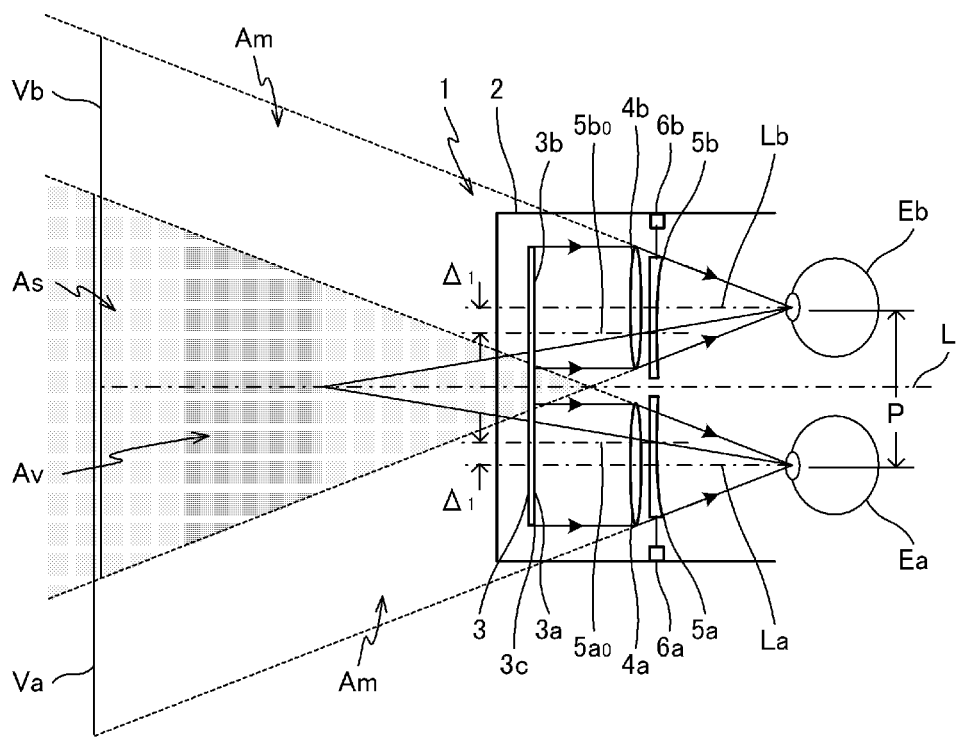
FIG. 6A is a diagram showing an example of shift amounts of wide-focus lenses with respect to virtual image forming lenses.
Figure 6B:
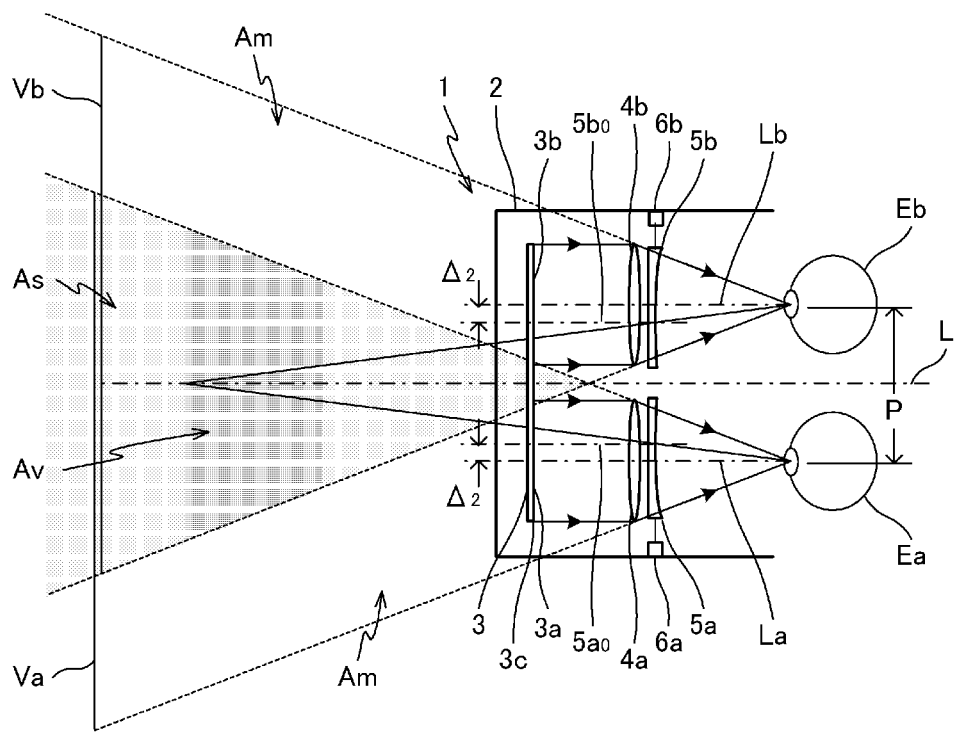
FIG. 6B is a diagram showing another example of shift amounts of the wide-focus lenses with respect to the virtual image forming lenses.

Therefore, by way of example, shift amounts Δ of the respective optical centers $5a_0$ and $5b_0$ (that is, optical axes) of the wide-focus lenses 5a and 5b for the left eye and the right eye with respect to the optical axes of the virtual image forming optical systems 4a and 4b for the left eye and the right eye can be determined as $\Delta=Pd/2(I_0+d)$ with respect to an interval P between the virtual image forming optical systems 4a and 4b for the left eye and the right eye in the left-right direction, a separation distance d between the wide-focus lenses 5a and 5b for the left eye and the right eye and the pupils of the left eye Ea and the right eye Eb, and a separation distance $I_0$ between the wide-focus lenses 5a and 5b for the left eye and the right eye and virtual images (that is, virtual image display planes Va and Vb) formed by the virtual image forming optical systems 4a and 4b for the left eye and the right eye. Accordingly, the range of comfortable stereovision without visual fatigue caused by vergence-accommodation conflict can be expanded near an intersection between the virtual image display planes Va and Vb and the centerline L. In addition, as shown in FIG. 6A and FIG. 6B, corresponding to the range Av in which the wide-focus lenses 5a and 5b for the left eye and the right eye display virtual images (that is, the range from the distance $I_1$ to $I_2$ from the wide-focus lenses 5a and 5b for the left eye and the right eye), the shift amounts Δ may be determined to be within the range from $\Delta_1=Pd/2(I_1+d)$ to $\Delta_2=Pd/2(I_2+d)$. Accordingly, the range of comfortable stereovision can be expanded near the centerline L in the range Av in which virtual images are displayed. Further, with respect to a separation distance Q between the pupils of the left eye Ea and the right eye Eb of a user and a working position in front of the user, the shift amounts Δ may be determined to be Pd/2Q, or determined to be within a range from Pd/2Q to $Pd/2(I_0+d)$. Accordingly, comfortable stereovision is enabled in a wide working region in front of the user.

In a case where a stereoscopic image is displayed in a narrow range, or an observation distance is long and an angle of view with respect to the range of the observation is small, the shift amounts Δ may be zero.

Actuators 6a and 6b are examples of displacement mechanisms, and are drive devices to drive the wide-focus lenses 5a and 5b for the left eye and the right eye in the left-right direction with respect to the virtual image forming optical systems 4a and 4b for the left eye and the right eye, respectively. As the actuators 6a and 6b, for example, electric motors can be used. The actuators 6a and 6b are respectively held inside the left and right side surfaces of the frame 2, and drive the wide-focus lenses 5a and 5b for the left eye and the right eye in the left-right direction by being activated by operation buttons provided on the side surfaces, etc., of the frame 2. Drive ranges of the lenses may include any of the above-described ranges. Accordingly, a stereoscopic image display range enabling a stereoscopic image to be viewed without visual fatigue caused by vergence-accommodation conflict can be displaced in a direction parallel to the centerline L.

Instead of the drive devices having power sources like the actuators 6a and 6b, instruments that displace the wide-focus lenses 5a and 5b for the left eye and the right eye in the left-right direction by manual operation of a dial, a ring, etc., may be employed. In addition, the wide-focus lenses 5a and 5b for the left eye and the right eye may be displaced in the left-right direction and tilted. In a case where the shift amounts Δ have no ranges or ranges sufficiently narrow, it is possible that the displacement mechanisms are not provided, and the virtual image forming optical systems 4a and 4b for the left eye and the right eye are fixed inside the frame 2.

As described above, the HMD 1 according to the first embodiment includes the display device 3 that displays images 3a and 3b for the left eye and the right eye on the screen 3c, the virtual image forming optical systems 4a and 4b for the left eye and the right eye respectively disposed with respect to the images 3a and 3b for the left eye and the right eye on the screen 3c, and the wide-focus lenses 5a and 5b for the left eye and the right eye that are respectively disposed with respect to the virtual image forming optical systems 4a and 4b for the left eye and the right eye so as to overlap the optical axis directions of the virtual image forming optical systems 4a and 4b for the left eye and the right eye, and having a negative focal length with a range. Virtual images of the images 3a and 3b for the left eye and the right eye formed by the virtual image forming optical systems 4a and 4b for the left eye and the right eye are respectively displayed by the respective wide-focus lenses 5a and 5b for the left eye and the right eye in a range with a width extending to the near side corresponding to the focal lengths of the respective wide-focus lenses 5a and 5b for the left eye and the right eye, having a range in the optical axis directions of the virtual image forming optical systems 4a and 4b for the left eye and the right eye, that is, due to expanding of the virtual image display range to the near side, the permissible range of vergence and accommodation expands to the near side, and accordingly, in the expanded region at the near side, a stereoscopic image displayed according to the images 3a and 3b for the left eye and the right eye can be viewed without visual fatigue caused by vergence-accommodation conflict.

In the HMD 1 according to the first embodiment, by disposing the wide-focus lenses 5a and 5b for the left eye and the right eye, having a negative focal length with a range, with respect to the virtual image forming optical systems 4a and 4b for the left eye and the right eye so as to overlap the respective optical axis directions of the virtual image forming optical systems 4a and 4b for the left eye and the right eye inside an existing HMD, the virtual image display range is expanded to the nearer side than the virtual image display planes Va and Vb, and accordingly, the permissible range of vergence and accommodation is expanded to the near side, so that in the expanded region at the near side, a stereoscopic image expressed by the images 3a and 3b for the left eye and the right eye can be viewed without visual fatigue caused by vergence-accommodation conflict.

Figure 7:
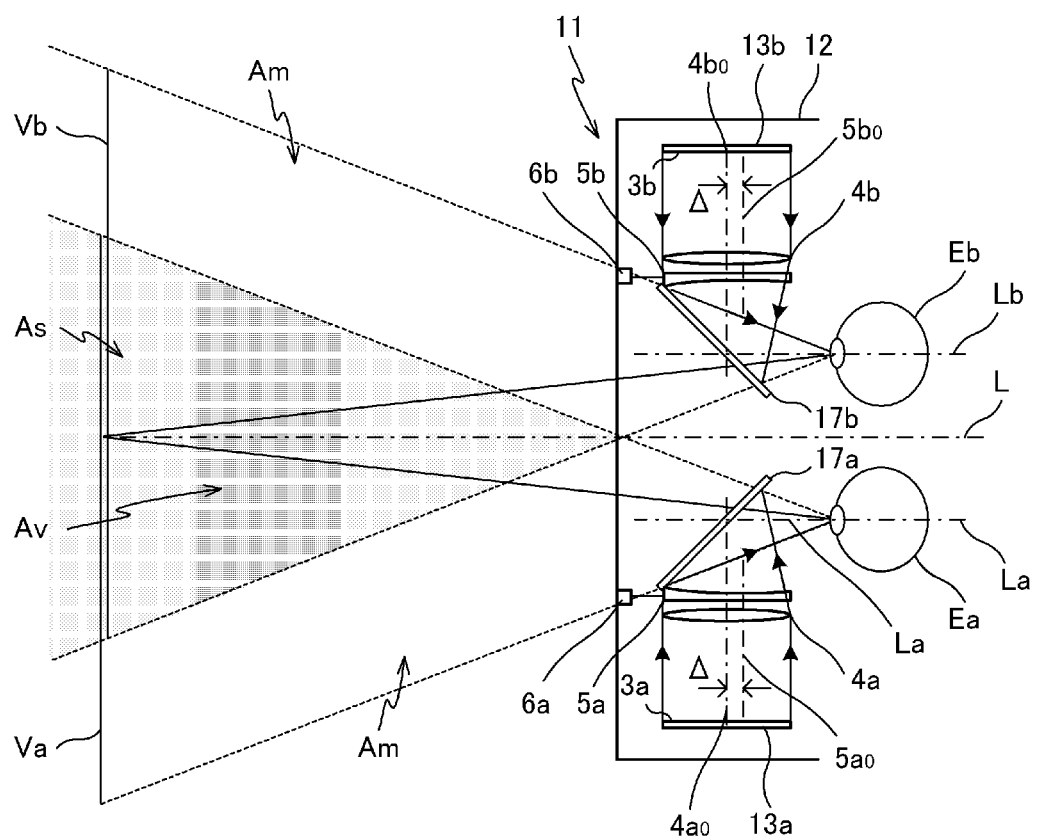
FIG. 7 is a diagram showing an outline configuration of an HMD for AR according to a second embodiment.

FIG. 7 shows an outline configuration of an HMD 11 for AR (simply referred to as an HMD 11, unless otherwise confusing) according to a second embodiment. The HMD 11 includes a frame 12, display devices 13a and 13b for the left eye and the right eye, half mirrors 17a and 17b for the left eye and the right eye, virtual image forming optical systems 4a and 4b for the left eye and the right eye, wide-focus lenses 5a and 5b for the left eye and the right eye, and actuators 6a and 6b. Among these components, components common to components of the HMD 1 according to the first embodiment are shown by using the same reference signs, and description thereof is omitted.

The frame 12 is a housing that holds the display devices 13a and 13b for the left eye and the right eye and other components. The frame 12 holds the display devices 13a and 13b for the left eye and the right eye inside left and right side surfaces, opens the back surface to allow the inside to be viewed from the back surface side, and has a transparent front surface so that, when the inside is viewed from the back surface side, the front side can be viewed, and holds the half mirrors 17a and 17b for the left eye and the right eye on main visual lines La and Lb of the left eye Ea and the right eye Eb so as to allow display surfaces of the display devices 13a and 13b for the left eye and the right eye to be viewed. The virtual image forming optical systems 4a and 4b for the left eye and the right eye are held inside the frame 12 so that, in a state where a user wears the HMD 11, the main visual lines La and Lb of the left eye Ea and the right eye Eb, respectively bent through the half mirrors 17a and 17b for the left eye and the right eye, respectively overlap or substantially overlap the optical axes $4a_0$ and $4b_0$ of the virtual image forming optical systems 4a and 4b for the left eye and the right eye.

The display devices 13a and 13b for the left eye and the right eye are devices to respectively display the images 3a and 3b for the left eye and the right eye on respective screens (also referred to as screens for the left eye and the right eye) of the display devices. As the display devices 13a and 13b, for example, flat panel displays such as liquid crystal displays and organic EL displays can be used. The display device 13a for the left eye is held inside the left side surface of the frame 12 so that its screen faces to the right. The display device 13b for the right eye is held inside the right side surface of the frame 12 so that its screen faces to the left.

The half mirrors 17a and 17b for the left eye and the right eye are respectively optical members to realize a see-through function that superposes and projects the images 3a and 3b for the left eye and the right eye and light from a target object ahead onto the left eye Ea and the right eye Eb by respectively reflecting the images 3a and 3b for the left eye and the right eye displayed on the screens of the display devices 13a and 13b for the left eye and the right eye and transmitting the light from the target object ahead. The half mirror 17a for the left eye is disposed at a side opposite to the screen for the left eye (display device 13a for the left eye) of the virtual image forming optical system 4a for the left eye, ahead of the user's left eye Ea (that is, on the main visual line La). The half mirror 17b for the right eye is disposed at a side opposite to the screen for the right eye (display device 13b for the right eye) of the virtual image forming optical system 4b for the right eye, ahead of the user's right eye Ea (that is, on the main visual line Lb).

The virtual image forming optical systems 4a and 4b for the left eye and the right eye are respectively disposed at the left side and the right side inside the frame 12 so as to face the screens of the display devices 13a and 13b for the left eye and the right eye, and form virtual images of the images 3a and 3b for the left eye and the right eye on virtual image display planes Va and Vb set ahead, and project magnified upright images of the virtual images on the left eye Ea and the right eye Eb.

When viewing the images 3a and 3b for the left eye and the right eye on the screens of the display devices 13a and 13b for the left eye and the right eye with the left eye and the right eye, respectively, through the half mirror 17a for the left eye and the virtual image forming optical system 4a for the left eye, and the half mirror 17b for the right eye and the virtual image forming optical system 4b for the right eye, but not virtually through the wide-focus lenses 5a and 5b for the left eye and the right eye, virtual images of the images 3a and 3b for the left eye and the right eye are projected on the virtual image display planes Va and Vb ahead. Here, when parallax images are provided as the images 3a and 3b for the left eye and the right eye, in an overlap region of the virtual image display planes Va and Vb, the virtual image on the virtual image display plane Va is viewed with the left eye Ea, and at the same time, the virtual image on the virtual image display plane Vb is viewed with the right eye Eb, and accordingly, in a region As in which the overlap region is viewable from both eyes, virtual images can be stereoscopically viewed to be superposed with a target object actually present in this region. That is, a stereoscopic image superposed with a target object inside the region As is projected.

The wide-focus lenses 5a and 5b for the left eye and the right eye are wide-focus lenses having a negative focal length with a range, and are respectively disposed with respect to the virtual image forming optical systems 4a and 4b for the left eye and the right eye so as to overlap optical axis directions of these optical systems. Accordingly, since focal lengths of the wide-focus lenses 5a and 5b for the left eye and the right eye have a range, virtual images of the images 3a and 3b for the left eye and the right eye formed by the virtual image forming optical systems 4a and 4b for the left eye and the right eye are displayed in a range with a width extending in the anteroposterior direction at the further side and/or nearer side than the virtual image display planes Va and Vb.

To enable viewing of a stereoscopic image without visual fatigue caused by vergence-accommodation conflict, focal lengths of the wide-focus lenses 5a and 5b for the left eye and the right eye can be determined in the same manner as in the HMD 1 according to the first embodiment. Accordingly, the virtual image forming range expands to the nearer side than the virtual image display planes Va and Vb, a range in which mismatch between vergence and accommodation is permitted expands to the near side, and comfortable stereovision in, for example, a working space that spreads in front of a user is enabled.

The optical centers $5a_0$ and $5b_0$ of the wide-focus lenses 5a and 5b for the left eye and the right eye are disposed by being respectively shifted rearward with respect to the optical centers (that is, the optical axes $4a_0$ and $4b_0$) of the virtual image forming optical systems 4a and 4b for the left eye and the right eye, that is, toward the centerline L through the half-mirrors 17a and 17b for the left eye and the right eye. Here, shift amounts Δ of the respective optical centers $5a_0$ and $5b_0$ of the wide-focus lenses 5a and 5b for the left eye and the right eye with respect to the optical axes $4a_0$ and $4b_0$ of the virtual image forming optical systems 4a and 4b for the left eye and the right eye can be determined in the same manner as in the HMD 1 according to the first embodiment. Accordingly, the range of comfortable stereovision can be expanded in the stereovision region As.

The actuators 6a and 6b are examples of displacement mechanisms, and are drive devices that respectively drive the wide-focus lenses 5a and 5b for the left eye and the right eye in the anteroposterior direction with respect to the virtual image forming optical systems 4a and 4b for the left eye and the right eye (that is, in a left-right direction through the half mirrors 17a and 17b for the left eye and the right eye). The actuators 6a and 6b are respectively held on the left and the right of the front surface of the frame 12, and drive the wide-focus lenses 5a and 5b for the left eye and the right eye in the anteroposterior direction by being activated by operation buttons provided on side surfaces, etc., of the frame 12. Accordingly, a stereoscopic image display range in which a stereoscopic image can be viewed without visual fatigue caused by vergence-accommodation conflict can be displaced in a direction parallel to the centerline L.

Instead of the drive devices having power sources like the actuators 6a and 6b, instruments that displace the wide-focus lenses 5a and 5b for the left eye and the right eye in the anteroposterior direction by manual manipulation of a dial, a ring, etc., may be employed. In addition the wide-focus lenses 5a and 5b for the left eye and the right eye may be displaced in the anteroposterior direction and tilted.

In the HMD 11 according to the present embodiment, inside the frame 12, the display device 13a for the left eye, the virtual image forming optical system 4a for the left eye, and the wide-focus lens 5a for the left eye are disposed on the left with respect to the half mirror 17a for the left eye on the main visual line La, however, instead of this, they may be disposed above or below the half mirror 17a for the left eye. In the HMD 11 according to the present embodiment, inside the frame 12, the display device 13b for the right eye, the virtual image forming optical system 4b for the right eye, and the wide-focus lens 5b for the right eye are disposed on the right with respect to the half mirror 17b for the right eye on the main visual line Lb, however, instead of this, they may be disposed above or below the half mirror 17b for the right eye.

As described above, the HMD 11 according to the second embodiment includes the display devices 13a and 13b for the left eye and the right eye that respectively display the images 3a and 3b for the left eye and the right eye on the screens of the display devices, the virtual image forming optical systems 4a and 4b for the left eye and the right eye respectively disposed with respect to the images 3a and 3b for the left eye and the right eye, the wide-focus lenses 5a and 5b for the left eye and the right eye having a negative focal length with a range and respectively disposed with respect to the virtual image forming optical systems 4a and 4b for the left eye and the right eye so as to overlap the optical axis directions of the virtual image forming optical systems 4a and 4b for the left eye and the right eye, the half mirror 17a for the left eye disposed at a side opposite to the screen for the left eye of the virtual image forming optical system 4a for the left eye, ahead of the user's left eye Ea, and the half mirror 17b for the right eye disposed at a side opposite to the screen for the right eye of the virtual image forming optical system 4b for the right eye, ahead of the user's right eye Eb. Virtual images of the images 3a and 3b for the left eye and the right eye, formed by the virtual image forming optical systems 4a and 4b for the left eye and the right eye, are respectively displayed by the wide-focus lenses 5a and 5b for the left eye and the right eye in a range with a width extending to the near side corresponding to focal lengths having a range of the respective wide-focus lenses 5a and 5b for the left eye and the right eye, that is, due to expanding of the virtual image display range to the near side, the permissible range of vergence and accommodation expands to the near side, and accordingly, in the expanded region at the near side, a stereoscopic image expressed by the images 3a and 3b for the left eye and the right eye can be viewed without visual fatigue caused by vergence-accommodation conflict.

In the HMD 11 according to the second embodiment, by respectively disposing the wide-focus lenses 5a and 5b for the left eye and the right eye having a negative focal length with a range with respect to the virtual image forming optical systems 4a and 4b for the left eye and the right eye so as to overlap optical axis directions of the virtual image forming optical systems inside an existing HMD, a virtual image display range is expanded to the nearer side than the virtual image display planes Va and Vb, and accordingly, the permissible range of vergence and accommodation is expanded to the near side, and therefore, in the expanded region at the near side, a stereoscopic image expressed by the images 3a and 3b for the left eye and the right eye can be viewed without visual fatigue caused by vergence-accommodation conflict.

Each of the HMDs 1 and 11 according to the first and second embodiments includes the virtual image forming optical systems 4a and 4b for the left eye and the right eye and the wide-focus lenses 5a and 5b for the left eye and the right eye configured independently from each other, however, instead of these, each HMD may include, for each of the left eye and the right eye, an image forming system including at least one free-form surface lens designed so as to have both of the functions of the virtual image forming optical system and the wide-focus lens.

In the HMD 11 according to the second embodiment, the half mirrors 17a and 17b for the left eye and the right eye are used to realize a see-through function, however, instead of these, a planar waveguide and a holographic optical element may be used in combination for reduction in size of the device.

In the HMDs 1 and 11 according to the first and second embodiments, the images 3a and 3b for the left eye and the right eye displayed by the display device 3 and the display devices 13a and 13b for the left eye and the right eye may be color images or black-and-white images. When they are color images, each of the HMDs may further include an optical system to correct chromatic aberration.

Next, an HMD 21 according to a third embodiment will be described. A basic configuration of the HMD 21 is the same as that of the HMD 1 according to the first embodiment, and the HMD 21 is different from the HMD 1 in that a wide-focus lens 25 described below is used as the wide-focus lenses 5a and 5b for the left eye and the right eye. The wide-focus lens 25 is a lens whose refractive power (power) at an optical center is 0 diopter, and average power gradually changes to the negative side from the optical center toward a lens peripheral edge portion. A focal length is expressed as a reciprocal of refractive power, so that the wide-focus lens 25 has a negative focal length with a range.

In the following description, the anteroposterior, the left-right, and the vertical directions as viewed from a user wearing the HMD 21 using the wide-focus lenses 25 are respectively defined as anteroposterior, left-right, and vertical directions in the lenses.

(A) in FIG. 8 is an outline view of the entirety of the wide-focus lens 25. The wide-focus lens 25 has a rear surface 52 formed as a concave surface defined by the following Equation (7), and a front surface 53 formed as a convex surface defined by the following Equation (8). An axis in the anteroposterior direction, passing through an optical center O (basic point $O_1$ on the rear surface 52, basic point $O_2$ on the front surface) of the wide-focus lens 25, is defined as the z-axis, and a positive direction of the Z axis is set in a direction toward the rear side of the wide-focus lens 25. The Z axis matches an optical axis of the wide-focus lens 25.

$$z = r^2/(R_1 + (R_1^2 - Kr^2)^{1/2}) + \delta_1 + \delta_2 \quad (7)$$

$$z = r_2/(R_2 + (R_2^2 - Kr^2)^{1/2}) \quad (8)$$

r in Equation (7) and Equation (8) is a distance from the z-axis. That is, considering an orthogonal coordinate system having an axis in the left-right direction and an axis in the vertical direction orthogonal to the z-axis, respectively set as an x-axis and a y-axis, and the basic point $O_1$ defined as a center on the rear surface 52 and the basic point $O_2$ defined as a center on the front surface 53, $r = (x^2 + y^2)^{1/2}$. $R_1$ and $R_2$ are curvature radiuses at apexes of the surfaces, K (conic constant) is 1. In Equation (7) defining the rear surface 52, $\delta_1$ is a first aspherical component expressed as $Ar^4 + Br^6 + Cr^8 + Dr^{10}$ (r is a distance from the z-axis, and A, B, C, and D are constants). $\delta_2$ is a second aspherical component expressed as $Er^3$ (r is a distance from the z-axis, and E is a positive constant). Therefore, the wide-focus lens 25 in this example has a front surface 53 being a spherical surface and a rear surface 52 being an aspherical surface. $R_1$ and $R_2$ are determined according to prescription power (0 D in this example).

In this way, the wide-focus lens 25 in this example is obtained by adding the aspherical components $\delta_1$ and $\delta_2$ to the refractive surface (spherical surface with a curvature radius $R_1$ in this example, hereinafter, also referred to as an original spherical surface, shown by a reference sign S) of the lens rear surface 52 determined based on prescription power.

Figure 9:
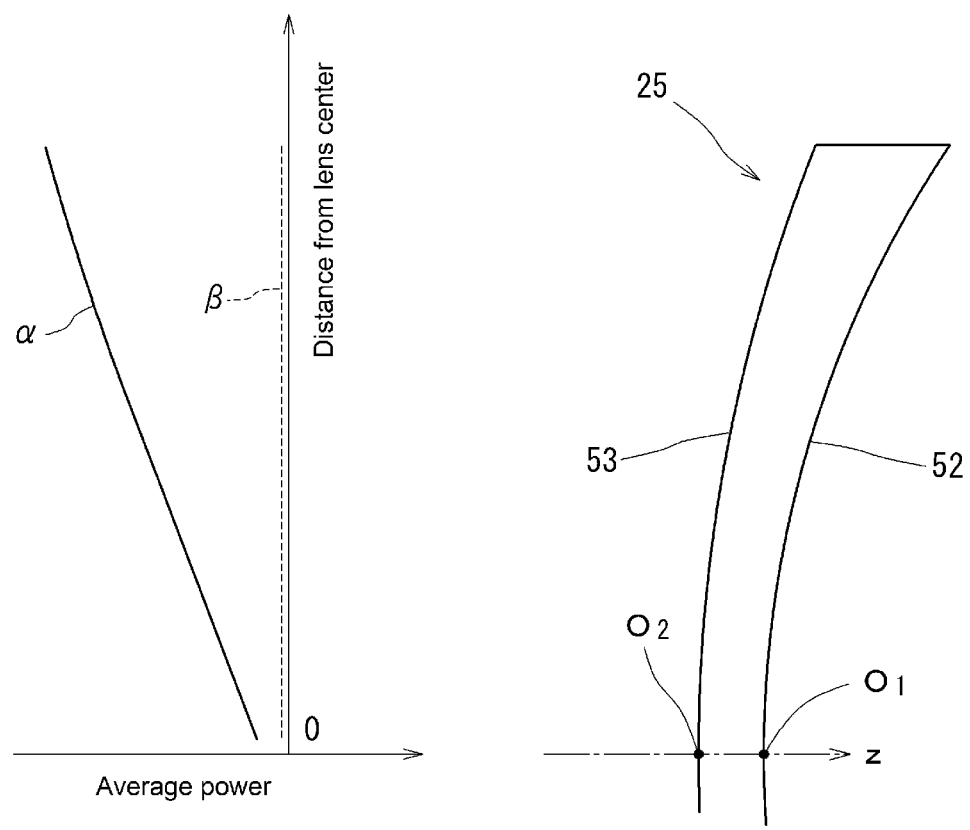
FIG. 9 is a diagram schematically showing changes in average power along a lens radial direction in the wide-focus lens shown in FIG. 8.

The second aspherical component $\delta_2$ expressed as $Er^3$ has an effect of substantially linearly changing average power α to the negative side along a lens radial direction from the optical center to a lens peripheral edge as shown in FIG. 9. Therefore, with this wide-focus lens 25, a range of focusing is expanded, and the focal length can be provided with a range.

A value of the constant E can be set as appropriate so that a target permissible range of vergence and accommodation can be obtained. For example, when the constant E is set to $1.66 \times 10^{-3}$, on the assumption that a pupil diameter is 5 mm, a change in average power in stereovision becomes approximately 0.5 D, and the permissible range of vergence and accommodation can be expanded to the extent illustrated in Paragraphs 0023 to 0025.

As shown in (B) in FIG. 8, when A is a height in the Z axis direction at a radius a based on the original spherical surface S (that is, an increase in thickness from the original spherical surface S), for example, in a case where the constant $E = 7.68 \times 10^{-6}$, a is 25 mm, and Δ showing an increase in thickness is 120 μm. $E = \Delta/1000/a^3$ is satisfied (unit of a: mm, unit of Δ: μm).

In this wide-focus lens 25, it is considered that, if there are variations in power distribution in a lens surface before the second aspherical component $\delta_2$ is added, the effect of expanding the permissible range of vergence and accommodation by the aspherical component $\delta_2$ expressed as $Er^3$ is offset by variations in power distribution that the lens originally has, and is not stably produced. Therefore, in the wide-focus lens 25, for the purpose of temporarily making the average power substantially constant from the lens center toward a peripheral edge portion, the first aspherical component $\delta_1$ expressed as $Ar^4 + Br^6 + Cr^8 + Dr^{10}$ (r is a distance from the z-axis, and A, B, C, and D are constants) is added to the lens rear surface 52.

Next, a method for designing the wide-focus lens 25 will be described. First, based on prescription power, a refractive surface of the front surface 53 and a refractive surface of the rear surface 52 of the wide-focus lens 25 are determined. A method of this determination is well known, and is not described in detail here. Next, aspherical components are added to the refractive surface (original spherical surface S) of the rear surface 52 of the lens determined based on the prescription power. In detail, the aspherical components are added to the refractive surface of the rear surface 52 through a first aspherical component adding process in which the first aspherical component $\delta_1$ for temporarily suppressing variations in average power is added, and a second aspherical component adding process in which the second aspherical component $\delta_2$ for changing the average power with a substantially constant gradient (substantially linearly) is added.

In the first aspherical component adding process, a first aspherical component $\delta_1$ expressed as $Ar^4 + Br^6 + Cr^8 + Dr^{10}$ (r is a distance from the z-axis, and A, B, C, and D are constants) is obtained and added to the refractive surface of the rear surface 52. In the lens to which the first aspherical component $\delta_1$ is added, as shown by the dashed line β in FIG. 9, the average power can be made substantially constant along a radial direction of the lens.

Regarding the first aspherical component $\delta_1$, a refractive surface shape of the rear surface 52 expressed by using the following Equation (9) for an aspherical surface is simulated by ray tracing, and aspherical coefficients A, B, C, and D optimum for suppressing changes in power (specifically, average power as an average of refractive power in the meridional direction and refractive power in the sagittal direction) are obtained, and from values of these aspherical coefficients, the first aspherical component $\delta_1$ can be obtained.

$$z = r^2/(R_1 + (R_1^2 - Kr^2)^{1/2}) + Ar^4 + Br^6 + Cr^8 + Dr^{10} \quad (9)$$

Here, z is a sag value in the rear surface 52, r is a distance from the z-axis, $R_1$ is a curvature radius of apex, and A, B, C, and D are constants (aspherical coefficients).

Next, in the second aspherical component adding process, the second aspherical component $\delta_2$ expressed as $Er^3$ (r is a distance from the z-axis, and E is a constant) is added to the refractive surface of the rear surface 52. By making larger the absolute value of this constant E, the range of comfortable stereovision (permissible range of vergence and accommodation) can be expanded. However, if the absolute value of the constant E is excessively increased, resolution of an obtained image deteriorates. Therefore, it is preferable that the constant E is set so that the absolute value of the constant E falls within the range from $6.40 \times 10^{-7}$ to $6.40 \times 10^{-5}$.

In this way, the refractive surface shape of the rear surface 52 of the wide-focus lens 25 defined by Equation (7) described above is determined.

EXAMPLES

Wide-focus lenses (Examples 1 to 4) assumed to be fitted to an HMD for AR were fabricated, and "viewability" and "eye fatigue" at the time of observation of stereoscopic display were evaluated.

Data common to the wide-focus lenses of Examples 1 to 4 are as follows.
Refractive index: 1.608
Front surface base curve: 4.12
Power: 0.00 D
Central thickness: 1.80 mm Values of constants of aspherical components added to each lens are as shown in the following Table 1.

TABLE 1

| | Example 1 | Example 2 | Example 3 | Example 4 |
|---|---|---|---|---|
| Constant A | −1.09E−08 | −1.09E−08 | −1.09E−08 | −1.09E−08 |
| Constant B | 3.70E−12 | 3.70E−12 | 3.70E−12 | 3.70E−12 |
| Constant C | −2.60E−15 | −2.60E−15 | −2.60E−15 | −2.60E−15 |
| Constant D | 6.66E−19 | 6.66E−19 | 6.66E−19 | 6.66E−19 |
| Constant E | 7.68E−06 | 9.92E−06 | 1.22E−05 | 1.66E−05 |
| Δ: Height (μm) at effective radius | 120 | 155 | 190 | 260 |
| a: Effective radius (mm) | 25 | 25 | 25 | 25 |

Subjects are four in number (age of 30 to 55), and two of the four are spectacle wearers. Each subject viewed commercially available stereoscopic video content (3D movie) in a state where the subject wore stereoscopic glasses (refer to FIG. 5A) including the wide-focus lenses of Examples. A distance between the display surface and the eyes of the subject was set to 90 to 120 cm. After viewing for a predetermined period of time, "viewability" and "eye fatigue" with the wide-focus lenses of Examples were evaluated according to 5 categories, bad, somewhat bad, unchanged, slightly better, and good, compared to the case where the glasses did not include the wide-focus lenses.

Figure 11A:
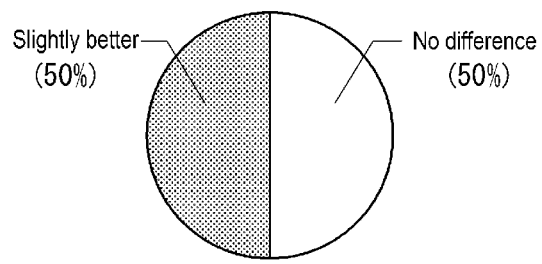
FIG. 11 is diagrams showing results of evaluation on the wide-focus lens shown in FIG. 8.
Figure 11B:
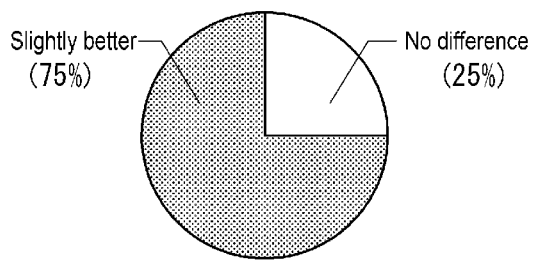

Results of evaluation on the wide-focus lens of Example 3 are shown in FIG. 11 and FIG. 12. FIG. 11 shows results (number of responses: 4) obtained after 30 minutes from the start of viewing of the movie. FIG. 12 shows results (number of responses: 3) obtained after 120 minutes from the viewing start.

According to these FIG. 11 and FIG. 12, a half or more of the results of evaluation on the wide-focus lens of Example 2 were "slightly better" in both of "viewability" and "eye fatigue." In particular, when the viewing time was long, the ratio of "slightly better" became high. Substantially the same results were obtained with the wide-focus lenses of other Examples 1, 2, and 4. This is considered to result from the effect of expanding the range of stereoscopic image display enabling comfortable stereovision to the near side by using the wide-focus lens that has a focal length with a range and the effect of expanding the virtual image display range to the near side.

As described above, the HMD 21 of the present embodiment is configured by adding the first aspherical component expressed as $Ar^4 + Br^6 + Cr^8 + Dr^{10}$ and the second aspherical component expressed as $Er^3$ to the wide-focus lenses 5a and 5b for the left eye and the right eye respectively disposed with respect to the virtual image forming optical systems 4a and 4b for the left eye and the right eye so as to overlap the optical axis directions of the virtual image forming optical systems 4a and 4b for the left eye and the right eye.

In the HMD 21 according to the present embodiment, power of the wide-focus lenses 5a and 5b changes in a radial direction due to the second aspherical component expressed as $Er^3$. That is, focal lengths of the wide-focus lenses 5a and 5b have a range, and the range of virtual image formation is expanded in the optical axis direction, and accordingly, without visual fatigue caused by vergence-accommodation conflict, the permissible range of vergence and accommodation enabling comfortable stereovision can be expanded.

Figure 10:
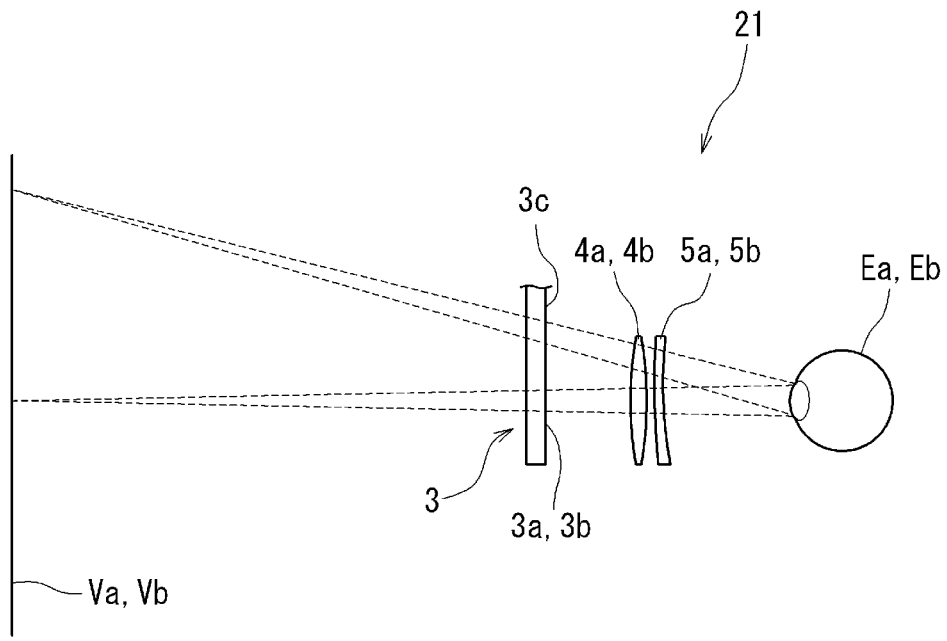
FIG. 10 is a diagram showing a relationship between a visual line of a user wearing the HMD according to the same embodiment, and the wide-focus lens.

FIG. 10 is a diagram showing a relationship between a visual line of a user and the wide-focus lenses 5a, 5b in the HMD 21 with a large angle of view. In the case of the HMD 21, in order to increase the immersive experience, a wide angle of view is preferred, and the angles of view of the virtual image display planes Va and Vb become large. Therefore, light beam groups that exit from the screen 3c of the display device 3 and enter the left eye Ea and the right eye Eb may pass through regions near peripheral edge portions as well as the central portions of the wide-focus lenses 5a and 5b as shown in FIG. 10. Here, in the present embodiment, by adding the first aspherical component expressed as $Ar^4 + Br^6 + Cr^8 + Dr^{10}$ in addition to the second aspherical component expressed as $Er^3$ to the wide-focus lens 25, a gradient of change in power can be maintained substantially constant in a wide range from the lens center to the lens peripheral edge portion, so that, even when a light beam group that enters the left eye Ea or the right eye Eb passes through a region near the lens peripheral edge portion of the wide-focus lenses 5a, 5b, the effect of the wide-focus lenses 5a, 5b on virtual image formation, that is, the effect of expanding the permissible range of vergence and accommodation, can be secured.

Other Modifications and Application Examples (1) The HMD 21 of the embodiment described above is an HMD for VR, however, the wide-focus lens 25 can be used for an HMD for AR as well.

(2) The embodiment described above is an example in which the first aspherical component $\delta_1$ is added to the rear surface 52 of the wide-focus lens, however, the first aspherical component $\delta_1$ may be added to the front surface 53 of the wide-focus lens, or can be added to both of the front surface 53 and the rear surface 52. For example, it is also possible that a first aspherical component $\delta_1$ expressed as $Ar^4 + Br^6$ (in this case, values of the constants C and D are zero) is added to the front surface 53, and further, a first aspherical component $\delta_1$ expressed as $Cr^8 + Dr^{10}$ (in this case, values of the constants A and B are zero) is added to the rear surface 52. When the aspherical component is added to either of the surfaces, what is required is to suppress fluctuation in average power from the optical center to a lens peripheral edge portion.

(3) The embodiment described above is an example in which the second aspherical component $\delta_2$ is added to the rear surface 52 of the wide-focus lens, however, the second aspherical component $\delta_2$ can be added to the front surface 53 of the wide-focus lens as well.

(4) The embodiments described above illustrate a wide-focus lens that is substantially plano, however, a wide-focus lens in which a power component for correcting at least any of myopia, hyperopia, and astigmatism is further set can also be used.

The present invention is described above by using embodiments, however, the technical scope of the present invention is not limited to the scope described in the embodiments above. It will be apparent to those skilled in the art that the embodiments described above can be variously modified or improved. From the description of the claims, it is clear that such modified or improved embodiments can also be included in the technical scope of the present invention.

It should be noted that execution sequences of the respective processes such as operations, procedures, steps, and stages, etc., in the devices, systems, programs, and methods shown in the claims, description, and drawings may be arbitrary sequences unless particular specifications such as "earlier than," "prior to" are clearly given or an output of a previous process is used in a subsequent process. Even if operation flows in the claims, description, and drawings are described by using "first," "next," etc., for convenience, they do not mean that execution in the specified sequence is essential.

REFERENCE SIGNS LIST

1, 21: head-mounted display (HMD, HMD for VR), 2: frame, 3: display device, 3a: image for left eye, 3b: image for right eye, 3c: screen, 4a: virtual image forming optical system for left eye (virtual image forming optical system), 4b: virtual image forming optical system for right eye (virtual image forming optical system), 4a$_0$, 4b$_0$: optical axis, 5a: wide-focus lens for left eye (wide-focus lens), 5b: wide-focus lens for right eye (wide-focus lens), 5a$_0$, 5b$_0$: optical center, 6a, 6b: actuator, 11: head-mounted display (HMD, HMD for AR), 12: frame, 13a: display device for left eye, 13b: display device for right eye, 17a: half mirror for left eye, 17b: half mirror for right eye, 25: wide-focus lens, 52: rear surface, 53: front surface, Am: region, As: region, Av: range, D: display surface, Ea: left eye, Eb: right eye, L: centerline, La, Lb: main visual line, Va, Vb: virtual image display plane, $\Delta$: shift amount, $\delta_1$, $\delta_2$: aspherical component

The invention claimed is:

1. A head-mounted display comprising:
   a display device to display images for the left eye and the right eye on a screen;
   virtual image forming optical systems for the left eye and the right eye, respectively disposed with respect to images for the left eye and the right eye on the screen; and
   wide-focus lenses for the left eye and the right eye having a negative focal length with a range, and respectively disposed with respect to the virtual image forming optical systems for the left eye and the right eye so as to overlap optical axis directions of the virtual image forming optical systems for the left eye and the right eye,
   wherein the wide-focus lenses have a region having a refractive power a value of which is negative and minimum in an absolute value, where the value includes zero, at an optical center,
   wherein the refractive power of the region becomes increasingly negative and larger in absolute value with an increasing distance from the optical center, as a result the wide-focus lenses have the negative focal length with the range, and
   wherein the wide-focus lenses have a refractive power distribution with a width of at least 0.5 D in absolute value without a downward convex inflection point in a 5 mm diameter near-center region centered on the optical center.

2. The head-mounted display according to claim 1, wherein optical centers of the wide-focus lenses for the left eye and the right eye are disposed by being respectively shifted toward a center side between the lenses in a left-right direction with respect to optical centers of the virtual image forming optical systems for the left eye and the right eye.

3. The head-mounted display according to claim 2, wherein shift amounts $\Delta$ of the respective optical centers of the wide-focus lenses for the left eye and the right eye with respect to optical axes of lenses of the virtual image forming optical systems for the left eye and the right eye which the wide-focus lenses are made to overlap, are within a range of $\Delta = Pd/2Q$ to $Pd/2(I_0+d)$ with respect to an interval P between the virtual image forming optical systems for the left eye and the right eye in the left-right direction, a separation distance d between the wide-focus lenses for the left eye and the right eye and the pupils of the left eye and the right eye of a user, a separation distance $I_0$ between the wide-focus lenses for the left eye and the right eye and virtual images formed by the virtual image forming optical systems for the left eye and the right eye, and a separation distance Q between the pupils of the left eye and the right eye of the user and a working position in front of the user.

4. The head-mounted display according to claim 3, further comprising: displacement mechanisms to respectively displace the wide-focus lenses for the left eye and the right eye in the left-right direction with respect to the virtual image forming optical systems for the left eye and the right eye.

5. The head-mounted display according to claim 4, wherein
   the display device includes screens for the left eye and the right eye to respectively display the images for the left eye and the right eye, and
   the head-mounted display further comprising:
   a half mirror for the left eye disposed at a side opposite to the screen for the left eye of the virtual image forming optical system for the left eye, ahead of the user's left eye; and
   a half mirror for the right eye disposed at a side opposite to the screen for the right eye of the virtual image forming optical system for the right eye, ahead of the user's right eye.

6. The head-mounted display according to claim 3, wherein
   the display device includes screens for the left eye and the right eye to respectively display the images for the left eye and the right eye, and the head-mounted display further comprising:
- a half mirror for the left eye disposed at a side opposite to the screen for the left eye of the virtual image forming optical system for the left eye, ahead of the user's left eye; and
- a half mirror for the right eye disposed at a side opposite to the screen for the right eye of the virtual image forming optical system for the right eye, ahead of the user's right eye.

7. The head-mounted display according to claim 2, wherein
the display device includes screens for the left eye and the right eye to respectively display the images for the left eye and the right eye, and
the head-mounted display further comprising:
- a half mirror for the left eye disposed at a side opposite to the screen for the left eye of the virtual image forming optical system for the left eye, ahead of the user's left eye; and
- a half mirror for the right eye disposed at a side opposite to the screen for the right eye of the virtual image forming optical system for the right eye, ahead of the user's right eye.

8. The head-mounted display according to claim 1, wherein
the display device includes screens for the left eye and the right eye to respectively display the images for the left eye and the right eye, and
the head-mounted display further comprising:
- a half mirror for the left eye disposed at a side opposite to the screen for the left eye of the virtual image forming optical system for the left eye, ahead of the user's left eye; and
- a half mirror for the right eye disposed at a side opposite to the screen for the right eye of the virtual image forming optical system for the right eye, ahead of the user's right eye.

9. The head-mounted display according to claim 1, wherein
when an axis in the anteroposterior direction, passing through an optical center of a wide-focus lens to be used as the wide-focus lenses for the left eye and the right eye, is defined as a z-axis, and a direction toward the rear side of the lens is defined as a positive direction of the z-axis, a first aspherical component expressed as $Ar^4+Br^6+Cr^8+Dr^{10}$ (r is a distance from the z-axis, and A, B, C, and D are constants) and suppressing fluctuation in average power from the optical center to a lens peripheral edge portion is added to a z-coordinate value of at least one of the front surface and the rear surface of the lens, and
a second aspherical component expressed as $Er^3$ (E is a constant) is added to a z-coordinate value of either of the front surface and the rear surface of the lens.

10. A method for designing the wide-focus lens according to claim 9, comprising:
- a first aspherical component adding process in which, when an axis in the anteroposterior direction, passing through the optical center, is defined as a z-axis, and a direction toward the rear side of the lens is defined as a positive direction of the z-axis, a first aspherical component expressed as $Ar^4+Br^6+Cr^8+Dr^{10}$ (r is a distance from the z-axis, and A, B, C, and D are constants) and suppressing fluctuation in average power from the optical center to a lens peripheral edge portion is added to a z-coordinate value of at least one of the front surface and the rear surface of the lens determined based on prescription power; and
- a second aspherical component adding process in which a second aspherical component expressed as $Er^3$ (E is a constant) is added to a z-coordinate value of either of the front surface and the rear surface of the lens.

11. The head-mounted display according to claim 1, wherein the wide-focus lenses are configured integrally with the virtual image forming optical systems.

\* \* \* \* \*